(12) United States Patent
Behin et al.

(10) Patent No.: US 6,593,677 B2
(45) Date of Patent: *Jul. 15, 2003

(54) BIASED ROTATABLE COMBDRIVE DEVICES AND METHODS

(75) Inventors: Behrang Behin, Berkeley, CA (US); Satinderpall Pannu, Berkeley, CA (US)

(73) Assignee: Onix Microsystems, Inc., Fremont, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 09/810,336

(22) Filed: Mar. 14, 2001

(65) Prior Publication Data

US 2001/0050801 A1 Dec. 13, 2001

Related U.S. Application Data

(60) Provisional application No. 60/191,856, filed on Mar. 24, 2000.

(51) Int. Cl.$^7$ .......................... H02N 1/00; G02B 26/08; G02B 26/10

(52) U.S. Cl. .................. 310/309; 359/224; 359/290; 73/504.12; 324/661

(58) Field of Search ...................... 310/309; 318/116; 359/223, 324, 298, 872, 877, 290, 291; 73/504.12, 504.14, 504.02, 514.16, 514.29; 324/661, 662, 658, 679, 207.11, 207.14; 251/129.01

(56) References Cited

U.S. PATENT DOCUMENTS 4,317,611 A    3/1982 Petersen ............... 350/6.6

(List continued on next page.)

FOREIGN PATENT DOCUMENTS

DE    296118818    12/1996    .......... G02B/6/35

(List continued on next page.)

OTHER PUBLICATIONS

"Electrostatic Comb Drive For Vertical Actuation" A.P. Lee et al., Proceedings of the SPIE, SPIE, Bellingham, VA, vol. 3224, Sep. 29, 1997, pp 109–119.

(List continued on next page.)

*Primary Examiner*—Karl Tamai
(74) *Attorney, Agent, or Firm*—JDI Patent; Joshua D. Isenberg

(57) ABSTRACT

Rotating devices including actuators and position sensors that employ combdrives are described. One design of a combdrive fabricated from a single layer is provided such that, in a nominal state, the two sets of comb fingers are substantially interdigitated according to a predetermined engagement. A rotating element may be attached to a rotatable flexure disposed along an axis and coupled to the comb fingers along with a biasing element attached to the rotating element to cause the comb fingers along with the rotating element to undergo a controlled angular displacement from the initial engagement and in response to feedback from sensing the position of the movable or rotating element. A voltage may be applied between comb fingers to cause the rotating element to undergo further rotation about the axis in a predetermined manner. Alternatively, a time-vary biasing force may be exerted on the rotating element, causing the first comb fingers along with the rotating element to undergo further rotation about the axis in a predetermined manner. The combdriven device can serve as both rotating actuators and position sensor. By arranging two such combdrives in a gimbaled structure bi-axial rotating actuators and position sensors may be constructed. The combdrive devices of the present invention can be employed in a broad range of applications, including biomedical devices, optical devices for tracking and display, telecommunication devices such as fiber-optic switches, inertial sensors, and magnetic disk drives.

60 Claims, 8 Drawing Sheets

U.S. PATENT DOCUMENTS

| | | | |
|---|---|---|---|
| 4,413,766 A | 11/1983 | Webster | 228/123 |
| 5,408,731 A | 4/1995 | Berggvist et al. | 29/25.41 |
| 5,541,437 A | 7/1996 | Watanabe et al. | 257/417 |
| 5,543,956 A | 8/1996 | Nakagawa et al. | 359/225 |
| 5,565,625 A | 10/1996 | Howe et al. | 73/514.16 |
| 5,648,618 A | 7/1997 | Neukermans et al. | 73/862.08 |
| 5,723,353 A | 3/1998 | Muenzel et al. | 437/51 |
| 5,726,073 A | 3/1998 | Zhang et al. | 437/228 |
| 5,753,911 A | 5/1998 | Yasuda et al. | 250/306 |
| 5,872,880 A | 2/1999 | Maynard | 385/88 |
| 5,881,198 A | 3/1999 | Haake | 385/136 |
| 5,959,760 A | 9/1999 | Yamada et al. | 359/224 |
| 5,969,848 A | 10/1999 | Lee et al. | 359/298 |
| 5,995,334 A | 11/1999 | Fan et al. | 360/106 |
| 5,998,906 A | 12/1999 | Jerman et al. | 310/309 |
| 6,000,280 A | 12/1999 | Miller et al. | 73/105 |
| 6,025,951 A | 2/2000 | Swart et al. | 359/245 |
| 6,067,858 A | 5/2000 | Clark et al. | 73/504.16 |
| 6,133,670 A | 10/2000 | Rodgers et al. | 310/309 |
| 6,201,629 B1 | 3/2001 | McClelland et al. | 359/223 |
| 6,215,222 B1 | 4/2001 | Hoen | 310/309 |
| 6,253,612 B1 | 7/2001 | Lemkin et al. | 73/504.02 |
| 6,257,062 B1 | 7/2001 | Rich | 73/514.32 |
| 6,330,102 B1 | 12/2001 | Daneman et al. | 359/290 |

FOREIGN PATENT DOCUMENTS

| | | | | |
|---|---|---|---|---|
| DE | 19757181 A | 7/1997 | | G02B/6/35 |
| DE | 19644918 A | 4/1998 | | G02B/6/35 |
| EP | 0907076 A2 | 4/1999 | | G01N/27/00 |
| EP | 0911952 A2 | 4/1999 | | H02N/1/00 |
| EP | 0911952 A3 | 4/2000 | | H02N/1/00 |
| EP | 1033601 | 9/2000 | | G02B/26/02 |
| EP | 0907076 A3 | 10/2000 | | H01J/37/63 |
| FR | 2732467 A1 | 4/1996 | | G01P/15/08 |

OTHER PUBLICATIONS

"Design, Fabrication, Position Sensing, And Control Of An Electrostatically–Driven Polysilicon Microactuator," P. Cheung et al, IEEE Transactions on Magnetics, vol. 32, No. 1, Jan. 1, 1996, pp 122–128.

"Optical Methods For Micromachine Monitoring And Feedback", F.M. Dickey et al., Sensors and Actuators, vol. 78, 1999, pp 220–235.

"A High Sensitivity Z–Axis Capacitive Silicon Microaccelerometer with a Torsional Suspension", Selvakumar et al., Journal of Microelectromechanical Systems, IEEE Inc., New York, vol. 7, No. 2, Jun. 1998, pp 192–200.

"MEMS Fabrication of High Aspect Ratio Track–Following Micro Actuator for Hard Disk Drive Using Silicon On Insulator", B. H. Kim et al., Technical Digest of the IEEE International MEMS '99 Converence. 12$^{th}$ IEEE International Conference on Micro Electro Mechanical Systems. Orlando, FL, Jan. 17–21, 1999, IEEE International Micro Electro Mechanical Systems Conference, New York, NY, 1999, pp 53–56.

"Fabrication of Comb–Shaped Microactuator for Multi–Degrees–of–Freedom System", F. Fujikawa et al., Robotics, CIM and Automation, Emerging Technologies, San Diego, Nov. 9–13, 1992, Proceedings of the International Converence on Industrial Electronics, Control, Instrumentation and Automation (IECON), New York, NY, IEEE, US, vol. 2 Conf 18, Nov. 9, 1992, pp 990–995.

"Integrated Micro–Scanning Tunneling Microscope", Xu et al., Applied Physics Letters, American Institute of Physics, New York, vol. 67, No. 16, Oct. 16, 1995 pp 2305–2307.

B. Behin et al., US Published patent application US–2001–002001–0048784–A1, Published Dec. 6, 2001, Ser. No. 09/751,660 "Two–Dimensional Gimbaled Scanning Actuator with Vertical Electrostatic Comb–Drive for Actuation and/or Sensing" Filed Dec. 28, 2000 (ONX–105).

B. Behin et al., US patent application Ser. No. 09/809,994 "Biased Rotatable Combdrive Actuator Methods" Filed Mar. 14, 2001 (ONX–106B).

B. Behin et al., US Published Patent Application US–2001–002001–0040419–A1, Published Nov. 15, 2001, Ser. No. 09/809,995 "Biased Rotatable Combdrive Sensor Methods", Filed Mar. 14, 2001 (ONX–106C).

B. Behin et al., US Published Patent Application, US–2001–002001–0051014–A1, Published Dec. 13, 2001, Ser. No. 09/810,326 "Optical Switch Employing Biased Rotatable Combdrive Devices and Methods", Filed Mar. 14, 2001 (ONX–106D).

B. Behin et al., US patent application Ser. No. 09/810,333 "Multi–Layer, Self–Aligned Vertical Combdrive Electrostatic Actuators And Fabrication Methods", Filed Mar. 14, 2001 (ONX–107A).

B. Behin et al., US patent application US–2001–002001–0034938–A1, Ser. No. 09/810,335 "Multi–layer, Self–Aligned Vertical Combdrive Electrostatic Actuators And Fabrication Methods", Filed Mar. 14, 2001 (ONX–107B).

"Vertical Comb Array MicroActuators", A. Selvakumar et al., Proceedings of the Workshop on Micro Elecrical Mechanical Systems (MEMS), Amsterdam, New York, Jan. 29–Feb. 2, 1995, IEEE vol. Workshop 8 Jan. 29, 1995, pp 43–48, ISBN 0–7803–2504–4.

"Fabrication of a 3D Differential–Capacitive Acceleration Sensor by UV–LIGA", W. Qu et al., Sensors and Actuators 77 (1999), pp 14–20, Elsevier Science, 0924–4247/99/$.

"Integrating SCREAM Micromachined Devices with Integrated Circuits", K.A. Shaw, N.C MacDonald, IEEE MEMS '96, San Diego, California 1996, IEEE Publication 0–7803–2985–6/96, pp 44–48.

"An electrostatically excited 2D–Micro–Scanning–Mirror with an in–plane configuration of the driving electrodes", H. Schenk et al., MEMS 2000, 13$^{th}$ Int. Micro Electro Mechanical Systems Conf, Miyazaki, Japan, p. 473–478 (2000).

"Damping of Micro Electrostatic Torsion Mirror Caused by Air–Film Viscosity", N. Uchida et al.

"Single Crystal Silicon (SCS) MicroMirror Arrays using Deep Silicon Etching and IR Alignment", C.S.B. Lee et al.

Zhimin Yao and Noel MacDonald, Single Crystal Silicon Supported Thin Film Micromirrors for Optical Applications, May 1997, p 1408–1413.

Pending U.S. patent, 09/585,835, "Staggered Torsional Electrostatic Combdrive and Method of Forming Same".

Robert Conant et al., "A Flat High–Frequency Scanning Micromirror," 2000, P1–3.

BIASED ROTATABLE COMBDRIVE DEVICES AND METHODS

CROSS-REFERENCES TO RELATED APPLICATIONS

This application claim the benefit of Provisional Application 60/191,856 filed Mar. 24, 2000, which is herein incorporated by reference for all purposes. This application is also related to commonly assigned U.S. patent applications Ser. 09/809,994, 09/809,995, and 09/810,326, which were filed on the same day as this application.

FIELD OF THE INVENTION

This invention relates generally to Micro-Electro-Mechanical-Systems (MEMS). More particularly, it is related to a novel class of vertical combdrive devices serving as rotating actuators and/or position sensors and methods for operating any combdrive.

BACKGROUND ART

The advent of silicon fabrication technologies has made possible a line of integrated devices in which micro-actuators and micro-mechanical structures are fabricated using processing technology similar to that used in the integrated-circuit industry. These integrated actuators have been employed in a variety of applications, such as fiber-optic switching, optical tracking for applications such as free-space communications, inertial sensors, and magnetic disk drives. They offer small size, low cost, high reliability, and superior performance. Furthermore, micro-machined structures may be integrated with Integrated Circuits (ICs) fabricated on the same substrate.

Various actuation methods can be employed in these integrated actuators, including electrostatic, electromagnetic, thermal, and thermo-pneumatic means. Electrostatic actuation becomes particularly attractive on a small size scale, since the electrostatic force increases as the gap between two charged elements decreases. Combdrive electrodes are widely used for generating electrostatic driving forces.

It is often desirable to create out-of-plane actuation of various microstructures, such as rotation of mirrors about an axis parallel to a substrate. These rotating mirrors can be used individually or in array form for applications such as adaptive optics, visual displays, or fiber-optic switching. Vertical combdrive actuators provide rotational motion or translational motion perpendicular to a substrate. A micro-machined electrostatic vertical actuator is disclosed in U.S. Pat. No. 5,969,848, issued to Lee et al. The device of Lee et al. contains a set of vertical combdrives, with each drive capable of deflecting one edge of a square mirror. By relying on an asymmetric distribution of electrical fields when a bias voltage is applied between stationary and movable comb fingers, the device of Lee et al. allows a small vertical (i.e. out of the plane of the comb fingers) motion of each mirror edge, at most 1.5 µm.

Larger movements and more simplified fabrication techniques are provided by staggered vertical combdrives, in which the stationary and moving combdrives are positioned parallel to one another, but with the plane of the moving comb above the plane of the stationary comb. The stationary comb fingers are an integral part of the substrate, while the moving comb is fixed to the substrate only through flexures. Applying a voltage between the two comb layers causes the moving comb teeth to be attracted to the stationary teeth and move to increase the overlap area, thereby exerting a force on the moving comb. Conventional fabrication techniques for vertical combdrives using standard photolithography processes require multiple steps for patterning the comb fingers. First, one set of comb teeth is fabricated on a first wafer layer. A second wafer layer is then bonded on top of the first wafer layer, followed by patterning and etching of a second layer to form the second set of comb teeth. The two wafer layers must be aligned to a very high precision; typical applications require comb fingers of 2 µm wide with a 6 µm separation distance, so that adjacent overlapped fingers are separated by only 2 µm. Vertical combdrives fabricated using this technique are prone to alignment problems. The steppers used to align the individual die on a wafer typically have a lateral resolution of ±0.25 µm. This resolution places a lower limit on the gap between adjacent comb fingers of about 2 µm. Because two adjacent fingers are at different potentials during operation, they cannot contact each other. At high actuation voltages, errors in alignment of the fingers can cause sideways motion and instability in the combdrive. As a result, conventional fabrication techniques typically have low production yields.

FIGS. 1A–1B depict a prior art rotating actuator employing a two-layer vertical combdrive. FIG. 1A shows rotating actuator 100 in a nominal state. A plurality of movable comb fingers 10, extending from a first micro-machined structure 11, are suspended above a plurality of stationary comb fingers 12, which extend from a second micro-machined structure 13. A rotating element 14, attached to a flexure 15, is mechanically engaged with first micro-machined structure 11 and therefore movable comb fingers 10. Rotating element 14 may carry a reflective surface so as to provide a scanning mirror for a given application. It is worth noting that stationary comb fingers 12 and movable comb fingers 10 are fabricated in two different layers of a substrate (not shown in FIG. 1A). FIG. 1B depicts a rotating state of rotating actuator 100 of FIG. 1A. The rotation can be generated by an electrostatic means, e.g., by applying a voltage between stationary comb fingers 12 and movable comb fingers 10. The capacitance between movable comb fingers 10 and stationary comb fingers 12 may be measured and resolved to determine and control the angular position of movable comb fingers 10.

In a combdrive actuator, it is desirable for the angular position of the movable comb fingers to vary with the applied voltage in a linear fashion; and it is also desirable for the stationary comb fingers and movable comb fingers to be aligned with respect to each other in a precise lateral alignment. This is owing to the fact that if the stationary and movable comb fingers are not well aligned, such that each of the movable comb fingers is centered within the gap between its respective neighboring stationary fingers, there arises a net lateral force upon application of a voltage between the stationary and movable comb fingers. Such a lateral force can cause non-linear and unstable behaviors in the motion of movable comb fingers. For example, sufficient lateral force can cause the movable comb fingers to snap into contact with the stationary comb fingers.

In the prior art combdrive system of FIGS. 1A–1B, however, because stationary comb fingers 12 and movable comb fingers 10 are not coplanar and therefore not substantially engaged in their initial positions, the motion of the combdrive thus constructed is significantly nonlinear, unless a sufficient force is exerted on the combdrive to engage stationary comb fingers 12 and movable comb fingers 10. Moreover, precise lateral alignment between stationary comb fingers 12 and movable comb fingers 10 is also inherently difficult to achieve in the above prior art combdrive system, because stationary comb fingers 12 and movable comb fingers 10 are fabricated in two different layers of the substrate. This can further result in non-linear and unstable behavior For example, in the prior art combdrive system of Conant et al. titled "Staggered Torsional Electrostatic Combdrive Micromirror", U.S. pending application serial number 09/584,835, a set of stationary combdrives is fabricated in one lithographic masking and etching step, and a set of moving combdrives is fabricated in a subsequent lithographic masking and etching step. A precise lateral alignment of these two sets of combdrives would dictate aligning the second lithographic masking step to the pattern of the first lithographic masking step during the manufacturing process.

Hence, any error in this alignment translates directly to a lateral misalignment between the movable and stationary combdrives, which results in nonlinear and unstable behaviors in the combdrive actuator thus produced.

Hence, there is a need in the art for a new type of rotating combdrive actuators and position sensors that overcome the shortcomings of the prior art systems, while providing a wide range of angular rotation along with versatile actuation and sensing capabilities.

SUMMARY OF THE INVENTION

The disadvantages associated with the prior art are overcome by a rotating device having one or more comb structures and biasing element to apply torsion force thereto and in response to position sensing of the rotating device. The device generally comprises a plurality of first comb fingers that interdigitate with a plurality of second comb fingers. In one embodiment, both pluralities may be fabricated from a single layer of a substrate such that they are self-aligned. The design of the combdrive device is such that in a nominal state, the two sets of comb fingers are substantially interdigitated according to a predetermined engagement. A rotating element, attached to a rotatable flexure disposed along an axis, is mechanically engaged with the first comb fingers. A biasing element (e.g., a magnetic material) is attached to the rotating element. When subject to a biasing force (e.g., a magnetic force), the biasing element causes the rotating element along with the first comb fingers to undergo a controlled angular displacement from the initial engagement. In one embodiment of the present invention, the combdrive device serves as a rotating actuator. This is accomplished by an application of a voltage between the second and first comb fingers, which causes rotation of the first comb fingers along with the rotating element back towards their initial position. The biasing force may be kept constant in this case. The capacitance between the second and first comb fingers is measured and used to monitor the angular motion of the rotating element. The measured capacitance can be further utilized in a feedback loop to control the angular position of the rotating element.

In another embodiment of the present invention, the combdrive device provides for a position sensor. A capacitance sensor measures a capacitance between the first and second comb fingers to monitor the angular position of the rotating element by way of the measured capacitance. A time-varying biasing force may be applied in this case to generate further rotation of the rotating element along with the first comb fingers in a predetermined manner. The angular position signal can be further fed to a feedback loop, so as to control the biasing force and hence the angular motion of the rotating element.

The present invention accommodates alternative position sensors comprised of gap closing electrodes, additional comb fingers, piezoresistive strain gauges, coils, magnets, piezoelectric sensors, optical sensors and combinations thereof.

The rotatable flexure may be a torsional flexure with cross-sections including a rectangular, I-shaped, or T-shaped cross-section, a cantilever-like flexure, serpentine flexure, a pin-and-staple type hinge, or any flexure, as one skilled in the art is capable of applying, to achieve rotation. A variety of biasing mechanisms may be employed to generate an initial angular displacement between the first and second comb fingers, including those that operate via pneumatic, thermal, magnetic principals, including coils that interact with an external magnetic field, electrostatic elements, such as gap closing electrodes, piezoelectric actuators and thermal bimorph actuators. Alternatively, the biasing element may be a mechanical, e.g., spring-loaded element, which may be incorporated into the rotatable flexure. In an alternative embodiment of the invention two sets of biased comb structures may be incorporated into a two-dimensional scanner. The scanner generally includes a rotatable gimbaled structure having a base, an outer frame, and an inner part. The outer frame may be attached to the base by a first pair of torsional flexures that allow the outer frame to rotate about a first axis. The inner part, hereby also known as the rotating element, may be attached to the outer frame by a second pair of torsional flexures that allow the inner part rotate about a second axis. The inner part may include a reflective surface such as a mirror. The scanner may include one or more electrostatic combdrives: a first combdrive positioned between the outer frame and the base, and a second combdrive positioned between the inner part and the outer frame. A biasing element, coupled to the outer frame, the inner part, or to both, causes initial angular displacements in the first and second combdrives. Either or both of the first and second combdrives may include one or more self-aligned comb structures.

Applying a voltage to either of the first and second combdrives causes the rotating element to undergo further rotation about either of the first and second axes. The biasing element may exert one or more constant forces on the rotating element. Moreover, the capacitances of the first and second combdrives may be measured to monitor and control the angular positions of the rotating element about the first and second axes respectively. Such a device may constitute a two-dimensional rotating actuator and use feedback from an alternative position sensor (e.g. gap closing electrodes, additional comb fingers, piezoresistive strain gauges, coils, magnets, piezoelectric sensors, optical sensors and combinations thereof) to control the angular position of the rotating element.

Alternatively, the biasing element may to exert one or more time-varying forces on the rotating element, causing it to undergo further rotation about either of the first and second axes. The capacitance between the first and second combdrives may be measured to monitor and control the angular positions of the rotating element about the first and second axes respectively. Such a device may provide for a two-dimensional actuator with a biaxial combdrive position sensor and use feedback from an alternative position sensor (e.g. gap closing electrodes, additional comb fingers, piezoresistive strain gauges, coils, magnets, piezoelectric sensors, optical sensors and combinations thereof) to control the angular position of the rotating element.

The first and second combdrives may be fabricated in a single layer of a substrate material which may comprise, but not be limited to, a combination of one or more of the following materials: single-crystalline silicon, polycrystalline silicon, amorphous silicon, ceramic, silicon-oxide, silicon-nitride, single-crystalline silicon-germanium, polycrystalline silicon-germanium, or a metal (such as nickel, chromium, aluminum or gold). The rotating element may be made of the same materials. The rotating element may comprise a reflective or light deflective surface, thereby providing a bi-axial steering or scanning mirror. The light deflective surface may include a surface coating to allow light deflection along more than one simultaneous path. Either of the first and second flexures can be a torsional flexure with a cross-section including, but not limited to, rectangular, I-shaped, or T-shaped cross-section, a cantilever-like flexure, serpentine flexure, pin-and-staple type hinge flexure and mechanical or non-mechanical torsion providing means as one skilled in the art would be capable of applying. First and second axes may be typically orthogonal to each other, though they can also be oriented in other ways as dictated by practical applications. The biasing element may comprise, but not limited to one or more biasing elements of magnetic, thermal, electrostatic, or mechanical types.

One embodiment of the invention utilizes self-aligned combdrives. An important advantage of self-aligned rotating combdrive devices is that by fabricating the comb fingers in a single layer of a substrate, the first and second comb fingers may start from a substantially co-planar and inter-digitated engagement, thereby substantially diminishing non-linear rotational effects that are often inherent in the prior art vertical combdrive actuators. Furthermore, if the first and second combdrives are defined by a single lithographic step, their alignment can be held to much tighter tolerances than in the prior art, providing for much more stable behavior than vertical combdrive actuators of the prior art. The performance of the rotating actuators and position sensors thus constructed is therefore more predictable than, and superior to, the prior art vertical combdrive devices.

It must be stated that the uni-axial and bi-axial rotating actuators and position sensors of the present invention can be employed in a broad range of applications, including, but not limited to, biomedical devices, optical devices for tracking and display, telecommunication devices such as fiber-optic switches, inertial sensors, and magnetic disk drives. For example, uni-axial and/or bi-axial rotating actuators employing reflective rotating elements can be used as steering mirrors to switch light between optical fibers in telecommunication applications. Arrays of such steering mirrors can be utilized to provide fiber-optic switches with very large port-counts. Use of the combdrives for sensing the angle of the mirrors in these applications is crucial since position sensing is needed for active and accurate control of the mirror angles, and pointing accuracy is the key to achieving low insertion losses in a fiber-optic switch.

The novel features of this invention, as well as the invention itself, will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
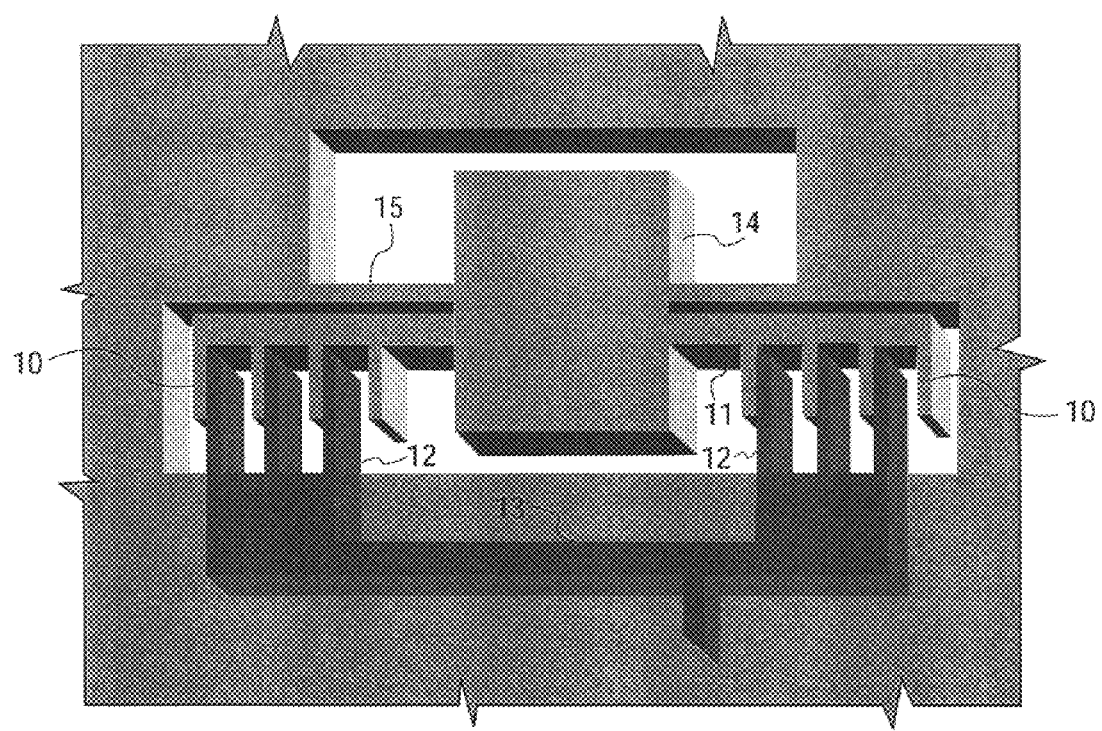
FIGS. 1A–1B show a prior art rotating actuator employing a two-layer combdrive in nominal and rotating states respectively.
Figure 1B:
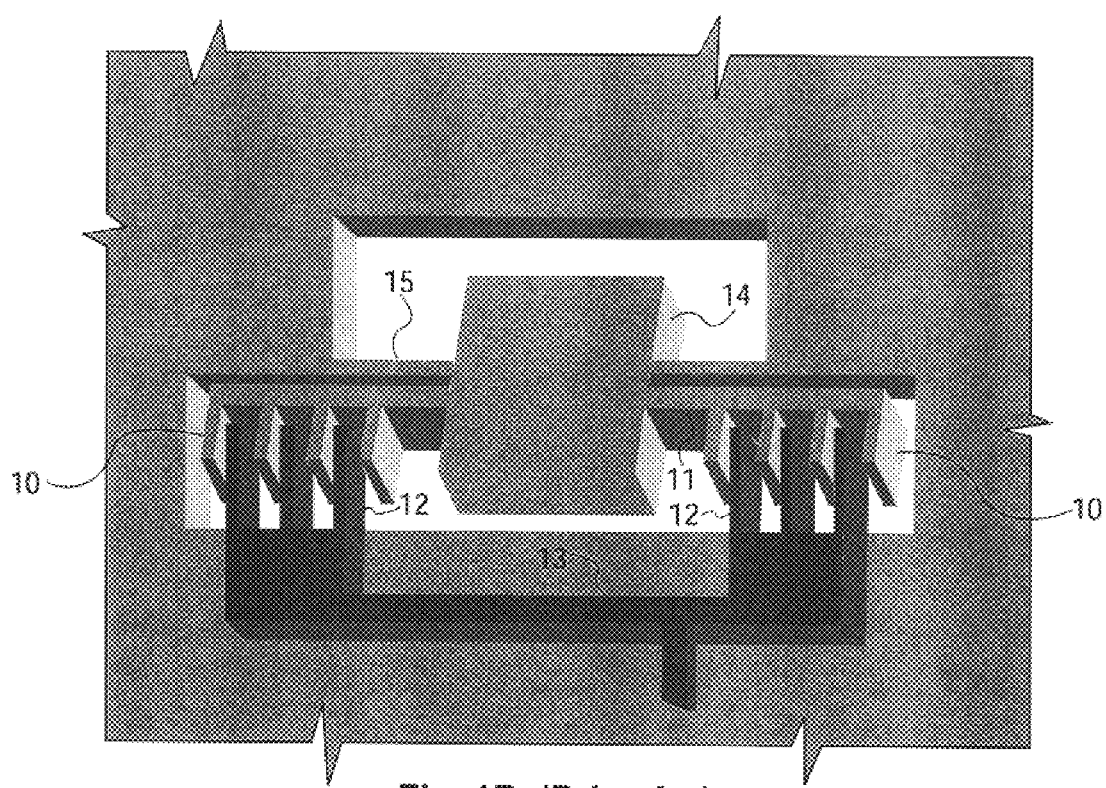
Figure 2:
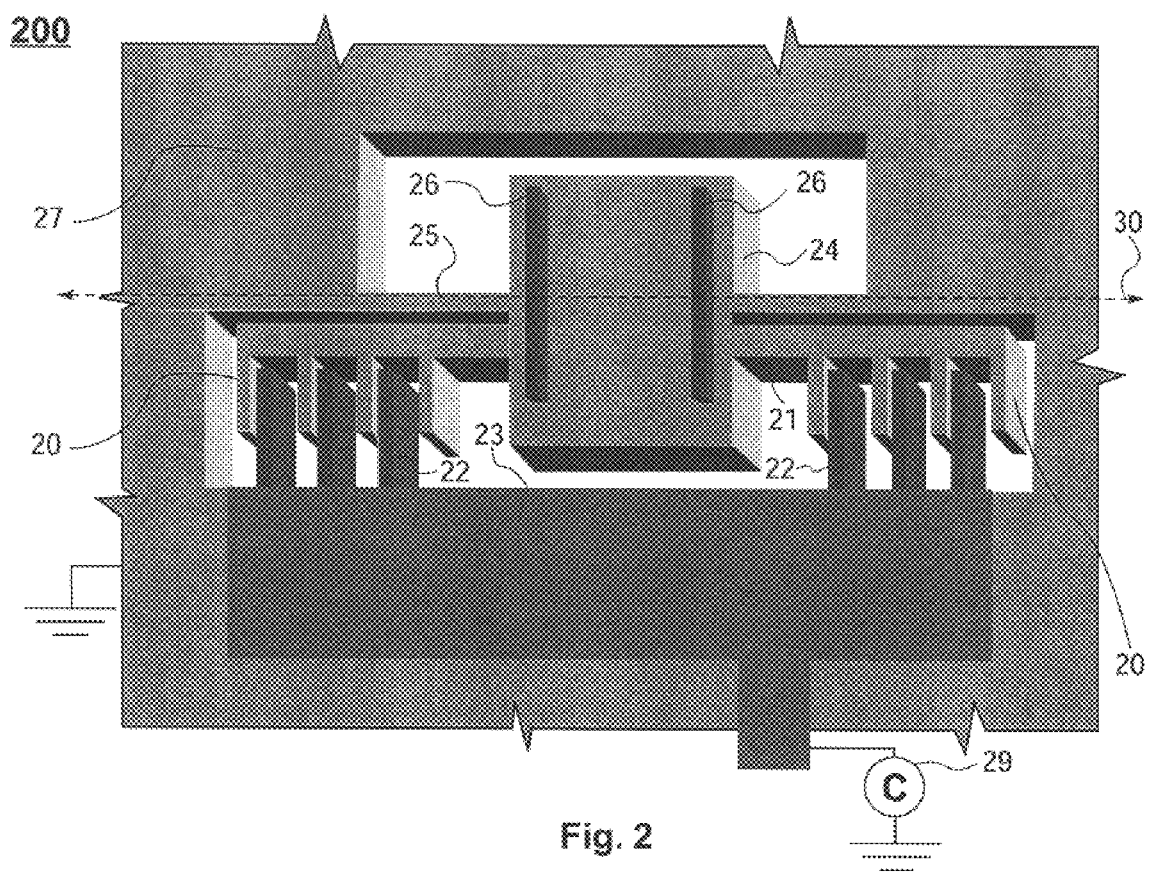
FIG. 2 depicts an exemplary embodiment of a uni-axial rotating device employing a biased combdrive in a nominal state according to an embodiment of the present invention.

FIG. 2 shows an exemplary embodiment of a uni-axial biased rotating actuator 200 employing a biased combdrive in a nominal state according to the present invention. In biased combdrive rotating actuator 200, a plurality of first comb fingers 20, extending from a first micro-machined structure 21, are substantially co-planar with a plurality of second comb fingers 22 extending from a second micro-machined structure 23. According to one embodiment of the present invention, second comb fingers 22 and first comb fingers 20 may be fabricated from a single layer of a substrate 27, thereby substantially interdigitated and self-aligned according to a predetermined engagement. Although much of the following discussion relates to self-aligned electrostatic combdrives, the advantages of biased actuation may be applied to other types of cob drives that are not self-aligned.

The substrate 27 may be, for example from a single-layer structure or multi-layer structure, such as a silicon-on-insulator (SOI) substrate having two conductive layers separated by an insulating layer. Both sets of comb fingers 20, 22 may be defined in the same step by etching a pattern in the substrate 27. The first and second comb fingers 20, 22 may be substantially co-planar. Alternatively, one of the sets of comb fingers may be selectively etched to remove portions of one of the structure so that the two sets of comb fingers are vertically offset with respect to each other, although they are still self-aligned. By way of example, the first and second comb fingers 20, 22 may be fabricated in a single layer of a substrate material comprising a combination of one or more of the following materials: single-crystalline silicon, poly-crystalline silicon, amorphous silicon, ceramic, silicon-oxide, silicon-nitride, single-crystalline silicon-germanium, poly-crystalline silicon-germanium, metal (such as nickel, chromium, aluminum, or gold), or a combination of these materials.

An example of a suitable SOI substrate for this application a silicon (Si) substrate layer approximately 400 μm thick, a silicon oxide (or glass) insulator layer approximately 2 μm thick, and a Si device layer approximately 50 μm thick. In this case, the rotating element, second comb fingers, and first comb fingers are made from the device layer, and the substrate layer is removed underneath the location of the rotating element and moving comb fingers to allow them clearance to rotate. The rotating element may comprise a reflective surface, so as to serve as a beam steering or scanning mirror.

In the embodiment shown in FIG. 2, the second comb fingers 22 may be electrically isolated from first comb fingers 20. A rotating element 24, comprising a micro-machined structure, may be attached to the substrate 27 by a rotatable flexure 25 disposed along an axis 30. The rotating element 24 may be further mechanically coupled to the micro-machined structure 21 along with first comb fingers 20. A biasing element 26, may be coupled to the rotating element 24. By way of example, the biasing element may be in the form of a magnetic material deposited on rotating element 24. The magnetic material may interact with an externally applied magnetic field to cause the first comb fingers 20 along with the rotating element 24 to undergo an angular displacement about the axis 30 from the initial interdigitated engagement. The angular position of the first comb fingers 20 may be measured, for example, by a capacitance sensor 29 coupled between the first comb fingers 20 and the second comb fingers 22.

In the above embodiment, biasing element 26 may employ a variety of biasing mechanisms to generate an initial angular displacement between first comb fingers 20 and second comb fingers 22 in the present invention. For instance, a current element can be attached to rotating element 24. When disposed in a magnetic field, a magnetic biasing force may exert on the current element, causing rotating element 24 along with first comb fingers 20 to undergo an angular displacement. Alternatively, a first electrode can be attached to rotating element 24 and a second electrode is placed in close proximity to the first electrode. When disposed in an electrical field, the electrical force between the two electrodes produces an angular displacement of rotating element 24 along with first comb fingers 20. Furthermore, a material with a residual stress gradient, termed a stress-bearing material hereinafter, can be coupled to rotating element 24, such that a releasing of the stress gradient causes rotating element 24 along with first comb fingers 20 to undergo an angular displacement. Rotatable flexure 25 may alternatively carry a stress-bearing material, to achieve the same purpose. Additionally, a spring-loading mechanism can be coupled to rotating element 24, such that upon unleashing the spring-loading mechanism may cause rotating element 24 along with first comb fingers 20 to undergo an angular displacement.

Alternatively, the biasing element 26 may include one or more of the following: stress-bearing material carrying a residual stress gradient, a thermal bimorph actuator, one or more gap-closing electrodes, or a second set of interdigitating comb fingers that are separate from the first and second comb fingers 22, 24. Other suitable biasing mechanisms may be used for generating an angular displacement in a biased combdrive of the embodiments of the present invention, for a given application.

Figure 3:
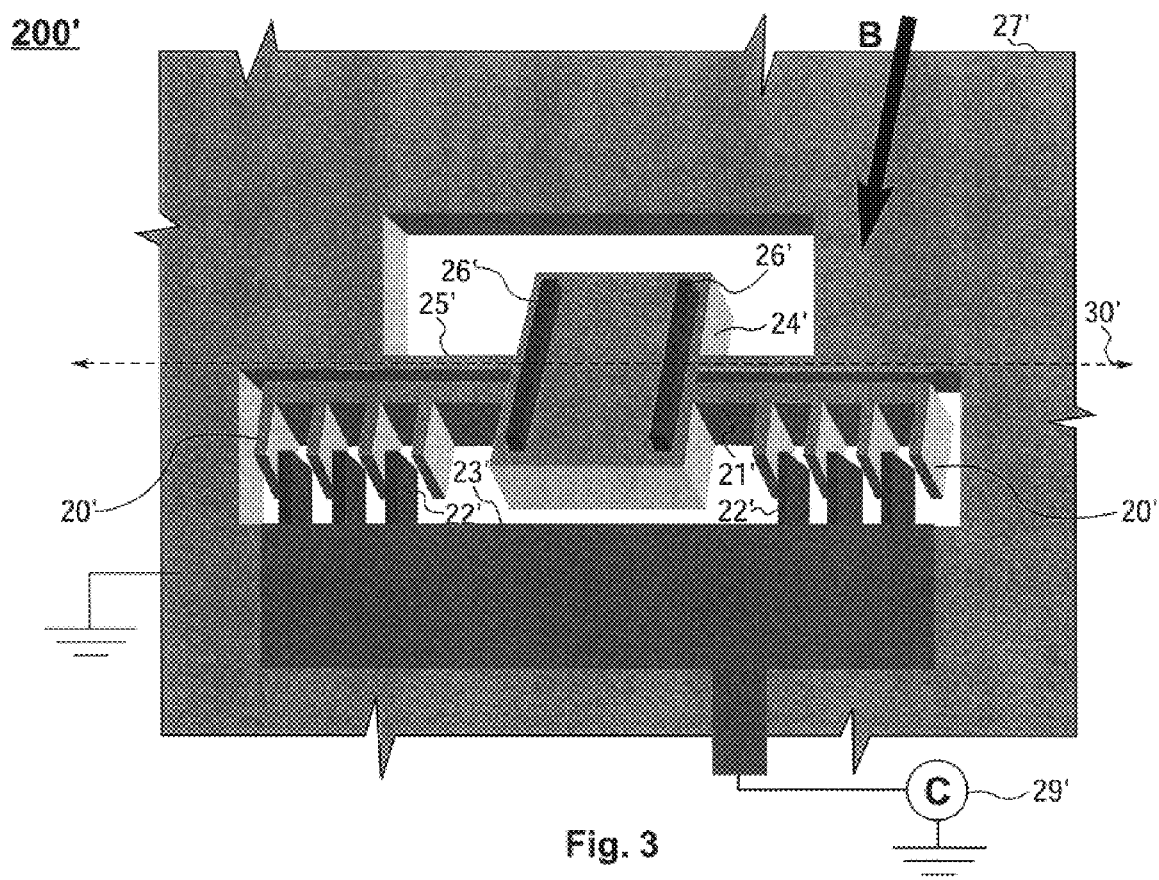
FIG. 3 shows an exemplary embodiment of a uni-axial rotating actuator employing a biased combdrive in a rotating state according to an embodiment of the present invention.

FIG. 3 shows an exemplary embodiment of a method of the present invention for generating an angular displacement in a biased combdrive rotating actuator 200' of the type shown FIG. 2. An external magnetic field B, may exert a magnetic biasing force on the magnetic material of biasing element 26'. This magnetic biasing force causes rotating element 24' and first comb fingers 20' to undergo an angular displacement about axis 30' from an initial interdigitated engagement with second comb fingers 22'. A rotatable flexure 25', e.g. coupled to a substrate 27' such as a torsional flexure, facilitates such a rotational motion. The angular position of the first comb fingers 20' may be measured, for example, by a capacitance sensor 29' coupled between the first comb fingers 20' and the second comb fingers 22'.

Figure 4:
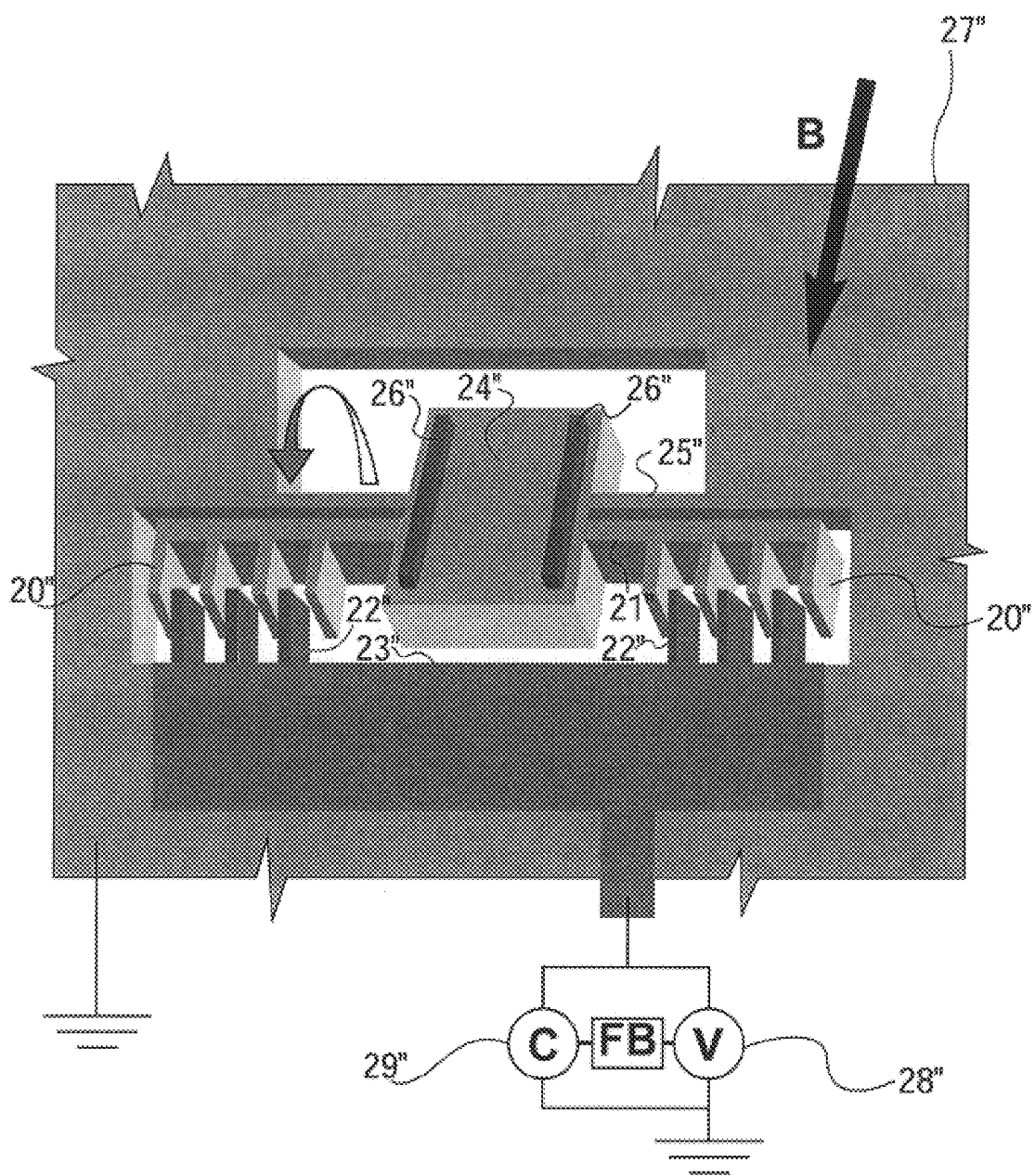
FIG. 4 illustrates an exemplary embodiment of a uni-axial, self-aligned rotating device in operation according to an embodiment of the present invention.

FIG. 4 illustrates an exemplary embodiment of an operation of a biased combdrive rotating actuator 200" of the type shown in FIG. 2. A voltage source 28 may be coupled between first comb fingers 20' and second comb fingers 22". The voltage source 28 applies a voltage between the first and second comb fingers 20" The electrostatic force thus generated overcomes the magnetic biasing force owing to external magnetic field B, causing first comb fingers 20" along with rotating element 24" to rotate about axis 30" towards an initial interdigitated engagement with the second comb fingers 22". A rotatable flexure 25", coupled, e.g., to a substrate 27", may further facilitate the rotational motion of rotating element 24" along with first comb fingers 20".

A capacitance sensor 29" may be coupled between the second comb fingers 22" and the first comb fingers 20". The capacitance sensor can be used to measure a capacitance between the first and second comb fingers 20", 22". The measured capacitance may be used to monitor the angular position of rotating element 24". A feedback mechanism FB may be coupled to the capacitance sensor 29" and the voltage source 28 in a feedback loop. In this configuration, the capacitance measured by the sensor 29" can be used to control the rotational motion of rotating element 24" and first comb fingers 20". In an alternative embodiment, the comb fingers 20", 22" may provide a driving force for rotating the rotating element 24" and a separate sensing means measures the angular position of the rotating element 24. Such a sensing means may include, but not be limited to, one or more of the following: one or more gap closing electrodes, a second plurality of first comb fingers coupled to the rotating element and a second plurality of second comb fingers that interdigitate with the first comb fingers in the second plurality, a piezoresistive strain gauge, coil, magnet, piezoelectric sensor, or an optical sensor. It must be stated that it is presently known that the output of a first sensor can be used to tune a second sensor to achieve higher accuracy telemetry than two sensors not linked.

In the exemplary embodiments of FIGS. 2–4, the biased combdrive structure may be fabricated in a single layer of a substrate material that may comprise, but not be limited to, silicon, ceramic, glass, single-crystalline silicon-germanium, poly-crystalline silicon-germanium, or a metal (such as nickel or gold). Surface and/or bulk micro-machining techniques as known in the art can be employed to fabricate the substrate material. The rotating elements 24, 24', 24" may be made of silicon, glass, nickel, nickel-alloy, gold, aluminum, chromium, or other materials having similar properties as one skilled in the art would be capable of applying. The rotating elements 24, 24', 24" may include reflective or light deflective surfaces, so as to provide a beam steering or scanning mirror. Rotatable flexures 25, 25', 25" can be, but should not be limited to, one or more of the following: torsional flexures, a cantilever-like flexures, serpentine flexures, or a pin-and-staple type hinges. Furthermore, the rotatable flexures 25, 25', 25" may have rectangular, I-shaped, or T-shaped cross-sections. A skilled artisan can implement a rotatable flexure in accordance with the present invention for a given application.

Although the comb fingers 20", 22" are depicted and described as providing both the capacitive sensing and a rotational driving force, the invention is in no way limited to this configuration. The comb fingers 20", 22" may provide purely a sensing function while the biasing mechanism 26" provides the driving force that rotates the rotating element 24". In such a case, the biasing mechanism may include, but not be limited to, one or more of the following: one or more gap closing electrodes, e.g. one electrode coupled to the rotating element 24" and one coupled to an underlying substrate (not shown), a piezoelectric mechanism coupled to the rotating element 24, a thermal bimorph actuator coupled to the rotating element 24, a spring loaded element coupled to the rotating element 24, a stress-bearing material carrying a residual stress gradient, a magnetic material with, e.g., a constant magnetic biasing field, or a second set of interdigitating comb fingers that are separate from comb fingers 20", 22". It must be stated that it is presently known that the telemetry from a first biasing mechanism can be used to configure a second biasing mechanism to achieve higher accuracy control than two biasing mechanisms not otherwise linked.

The present invention further provides a bi-axial rotating device comprising two biased combdrives arranged in a gimbaled structure and a rotating element mechanically coupled to both of the combdrives.

Figure 5:
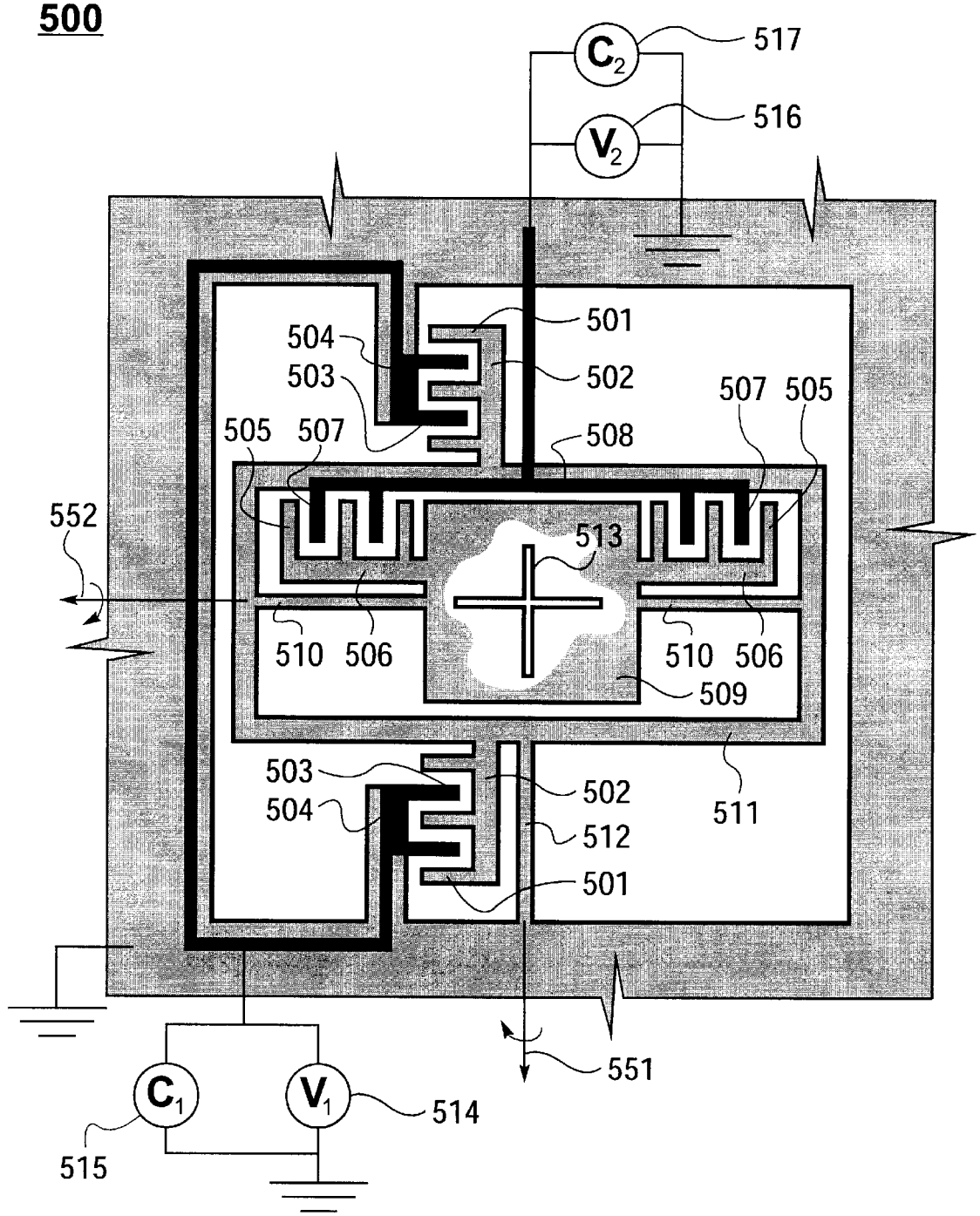
FIG. 5 depicts an exemplary embodiment of a bi-axial rotating device employing two biased combdrives according to an embodiment of the present invention.

FIG. 5 depicts an exemplary embodiment of a bi-axial biased combdrive rotating device of the present invention. In bi-axial rotating actuator 500, a plurality of first comb fingers 505, extending from a first micro-machined structure 506, may be substantially co-planar with a plurality of second comb fingers 507 extending from a second micro-machined structure 508, thus constituting the first combdrive. Second comb fingers 507 and first comb fingers 505 may be fabricated from a single layer of a substrate (not shown in FIG. 5), thereby substantially interdigitated in a first predetermined engagement. In the embodiment of FIG. 5, second comb fingers 507 may be electrically isolated from first comb fingers 505.

A rotating element 509 may be attached to a first rotatable flexure 510 disposed along a first axis 552. Rotating element 509 may also be mechanically engaged with first micro-machined structure 506 along with first comb fingers 505. First rotatable flexure 510 may be further attached to a frame 511, which is in turn mechanically engaged with a second rotatable flexure 512 disposed along a second axis 551 and also with a third micro-structure 502. A plurality of third comb fingers 501, extending from third micro-machined structure 502, may be substantially co-planar with a plurality of fourth comb fingers 503 extending from a fourth micro-machined structure 504, constituting the second combdrive. The third comb fingers 501 and fourth comb fingers 503 may be fabricated in the same layer of the substrate as first and second comb fingers 505, 507 in the first combdrive are, thereby substantially interdigitated in a second predetermined engagement. Fourth comb fingers 503 may likewise be electrically isolated from third comb fingers 501. Moreover, second comb fingers 507 can be made to be electrically isolated from fourth comb fingers 503. As such, the first and second combdrives may be coupled by way of frame 511. First axis 552 may be configured to be substantially orthogonal to second axis 551 in this embodiment. It should be noted that first and second rotatable flexures 510, 512, frame 511, rotating element 509, together with the first and second combdrives, may be substantially co-planar.

A biasing element 513 may be coupled to the rotating element 509, serving to cause first comb fingers 505 and/or third comb fingers 501, along with rotating element 509, to undergo angular displacements from their respective initial engagements about axes 552, 551 respectively. The "cross-like" shape of biasing element 513 illustrated in FIG. 5 is shown only to symbolize that the biasing element 513 is capable of generating angular displacements about both axes 551, 552 respectively. It must be stated that the shape and form of an actual biasing element in a given application may be different from that depicted in FIG. 5. First and second rotatable flexures 510, 512 may serve to facilitate the respective angular displacements about axes 552, 551 respectively. Biasing element 513 may be in the form of a single biasing element, such as a magnetic material coupled to an external magnetic field, so as to cause two angular displacements about two axes 552, 551 respectively. Biasing element 513 may also be in the form of two (or more) biasing elements, such as a magnetic material in a constant magnetic field, a magnetic coil, a stress-bearing material, a piezoelectric element, a thermal bimorph actuator one or more gap closing electrodes, comb finger electrodes, and the like providing two angular displacements about axes 552, 551 respectively. Furthermore, the biasing element 513 may be coupled to either or both of the Frame 511 and the fourth micro-machined structure 504. In all the above cases, the comb fingers 501, 503 and/or 505, 507 may be used as sensors to determine an angular position of the rotatable element with respect to the first and second axes 551, 552.

The biasing element 513 may alternatively include one or more of the following: one or more gap closing electrodes, e.g. one electrode coupled to the rotating element 509 and one coupled to an underlying substrate (not shown), a piezoelectric mechanism coupled to the rotating element, a thermal bimorph actuator coupled to the rotating element, a spring loaded element coupled to the rotating element, a stress-bearing material carrying a residual stress gradient, or a second set of interdigitating comb fingers that are separate from comb fingers 505, 507, 501, 503. It must be stated that it is presently known that the telemetry from a first biasing mechanism can be used to configure a second biasing mechanism to achieve higher accuracy control than two biasing mechanisms not otherwise linked.

A voltage applied by a voltage source 516 may be coupled between first comb fingers 505 and second comb fingers 507 to cause first comb fingers 505, along with rotating element 509, to rotate about axis 552 towards the first initial engagement. A capacitance sensor 517 may be coupled between the second comb fingers 507 and first comb fingers 505 to measure the capacitance therebetween. The capacitance measurement may be utilized to monitor and/or control the corresponding angular position. This measured capacitance can be further used in a feedback loop to control the rotational motion of first comb fingers 505 along with rotating element 509. Likewise, applying a voltage source 514 coupled between third comb fingers 501 and fourth comb fingers 503 may apply a voltage that causes third comb fingers 501, along with rotating element 509, to rotate about axis 551 towards the second initial engagement. The first and second rotatable flexures 510, 512 facilitate respective rotational motions. A capacitance sensor 515 may be coupled between the fourth comb fingers 503 and the third comb fingers 501. The capacitance sensor 515 measures the capacitance between the fourth comb fingers 503 and the third comb fingers 501. The measured capacitance may be used as to monitor and control the angular position of third comb fingers 501 along with rotating element 509, e.g. by use of a feedback mechanism coupled between the capacitance sensor 515 and the voltage source 514.

Alternatively, the comb fingers 501, 503, 505, 507 may be used for driving the rotating element 509 and the angular position of the rotating element 509 with respect to the first and second axes 551, 552 may be measured by a position-sensing means separate from the comb fingers 501, 503, 505, 507. Such a position sensing means may comprise, for example a second set comb fingers coupled to the rotating element 509 and frame 511. Alternatively the sensing means may include a piezoresistive strain gauge, a piezoelectric sensor, a pair of gap closing electrodes, or an optical sensor. Furthermore, the comb fingers 501, 503, 505, 507 may be used to sense the angular position of the rotating element 509 (e.g., by appropriate capacitance measurement) and the biasing element 513 may provide the force for driving the rotation.

The use of two self aligned rotating combdrives configured as shown in the embodiment of FIG. 5 enables the rotating element to rotate bi-axially. Moreover, if one of the combdrives is disabled, the system may effectively act as a uni-axial rotating actuator, in which the rotating element can selectively rotate about one of the two axes, such as axes 552, 551 in FIG. 5. It must be stated that it is presently known that the telemetry from a first axis sensor can be used with a second axis sensor to achieve higher sensing and control accuracy.

In the above embodiment, the first and second combdrives can be fabricated from a single layer of a substrate material comprising silicon, ceramic, glass, single-crystalline silicon-germanium, poly-crystalline silicon-germanium, metal (such as nickel or gold), or materials with similar properties as one skilled in the art is capable of applying. Surface and/or bulk micro-machining techniques as known in the art can be employed. Rotating element 509 may be made of silicon, glass, nickel, nickel-alloy, gold, aluminum, chromium, or materials with similar properties as one skilled in the art is capable of applying. Rotating element 509 may comprise a reflective surface, thereby providing a bi-axial steering or scanning mirror. Either of first and second rotatable flexures 510, 512 can be a torsional flexure, a cantilever-like flexure, serpentine flexure, or a pin-and-staple type hinge. The rotatable flexures 510, 512 may have rectangular, I-shaped, or T-shaped cross-sections. First and second axes 552, 551 may be typically orthogonal to each other; however, they can also be oriented in other ways as dictated by practical applications. Furthermore, biasing element 513 may comprise one or more biasing elements, each of magnetic, electrostatic, or mechanical means.

According to an embodiment of the invention, the first and second comb fingers 501, 503, and/or the third and fourth comb fingers 505, 507 may be formed in a single etching step such that the resulting combdrives are self-aligned. An important advantage of the self-aligned rotating combdrive actuators of this embodiment of the present invention is that by fabricating the comb fingers from a single layer of a substrate, the first and second comb fingers start from a substantially co-planar and interdigitated engagement, thereby diminishing non-linear rotational effects and instability that are often inherent in the prior art vertical combdrive actuators. The performance of the rotating actuators of the present invention is therefore more predictable. Further advantages of the self-aligned rotating combdrive actuators of the present invention are manifest in their simple design, compact size, low cost, and versatile performance.

The uni-axial and bi-axial rotating actuators of the present invention can be employed in a broad range of applications, including biomedical devices, optical devices for tracking and display, telecommunication devices such as fiber-optic switches, inertial sensors, and magnetic disk drives. For example, a uni-axial rotating actuator employing a reflective rotating element can be used as a scanning mirror for scanning a laser beam for bar-code reading applications. Uni-axial and/or bi-axial rotating actuators employing reflective rotating elements can be used as steering mirrors to switch light between optical fibers in telecommunication applications. Moreover, arrays of such steering mirrors can be utilized to provide fiber-optic switches with very large port-counts. A skilled artisan will know how to make use of uni-axial and bi-axial rotating actuators of the present invention for a given application.

Figure 6:
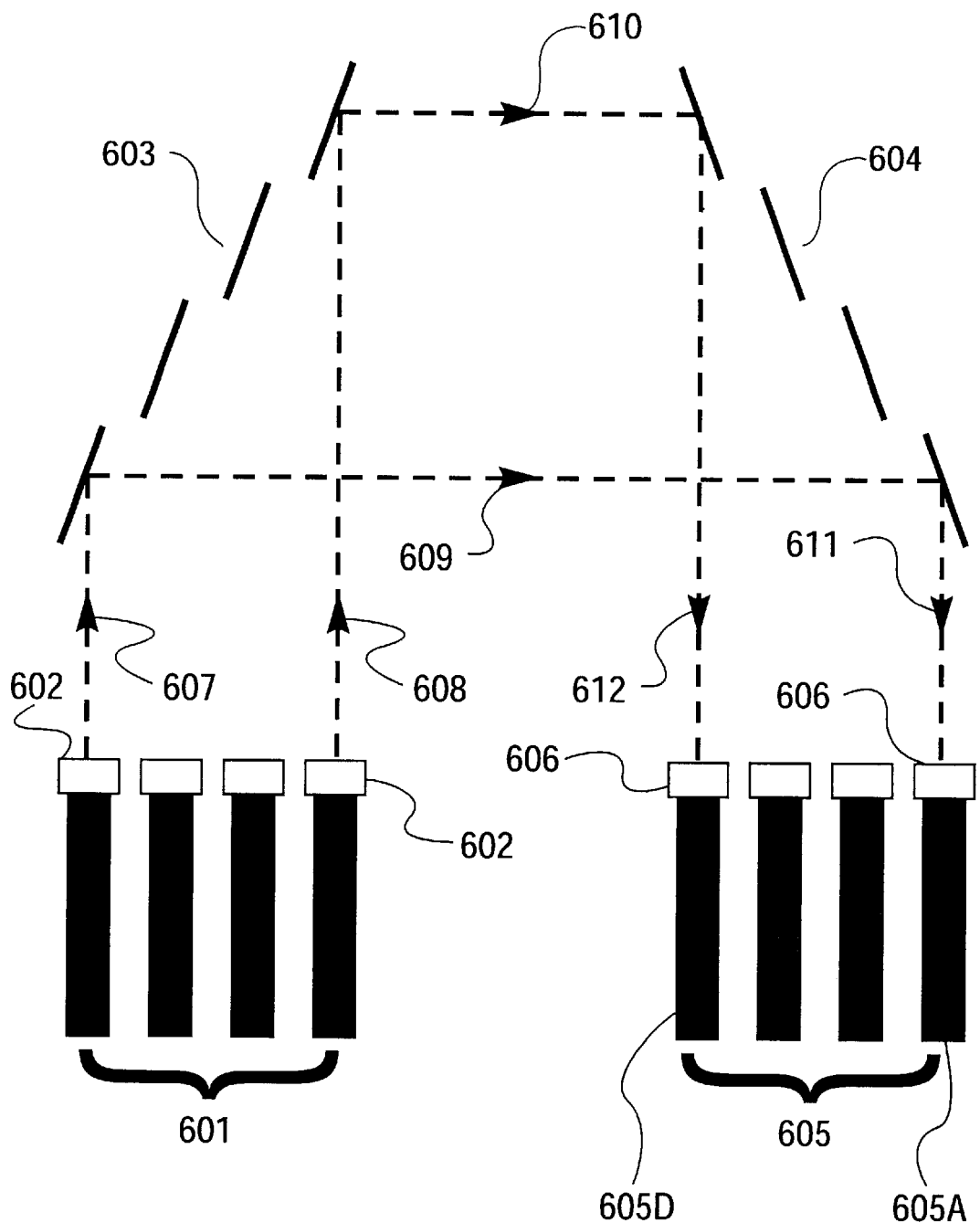
FIG. 6 shows simplified cross-sectional schematic diagram of an exemplary embodiment of a fiber-optic switch employing rotating devices of the present invention as beam steering mirrors.

As a way of example, FIG. 6 depicts an exemplary embodiment of a fiber-optic switch employing arrays of rotating actuators of the present invention. This is provided for example purposes only. Fiber-optic switch 600 comprises an array of input fibers 601 optically coupled to a first plurality of micro-lenses 602, a first array of steering mirrors 603 in the form of arrayed rotating actuators of the present invention, a second array of steering mirrors 604 in the form of arrayed rotating actuators of the present invention, and an array of output fibers 605 optically coupled to a second plurality of micro-lenses 606. The first array of steering mirrors 603 is positioned to intercept a plurality of input light beams, such as input beams 607, 608, emerging from the input fibers 601 and the microlenses 602, and steer these light beams towards the second array of steering mirrors 604. Each mirror in second array of steering mirrors 604 may likewise act independently to steer the light beams on an individual basis. The first and second arrays of steering mirrors 603, 604 may include uni-axial or bi-axial biased rotating combdrive actuators of the types described herein with respect to FIGS. 2–5 and 7, or a combination of these types.

Each mirror in the first array of steering mirrors 603 may act independently, such that the input light beams are steered on an individual basis. The second array of steering mirrors 604 may be positioned to receive a plurality of steered light beams, such as beams 609, 610, from the first array of steering mirrors 603. The second array of steering mirrors 604 in turn direct a plurality of output light beams, such as beams 611, 612, towards output fibers 605 in such a way that each output light beam is eventually coupled into one output fiber. By way of example, output beam 611 is coupled into output fiber 605A via its corresponding micro-lens, and output beam 612 is coupled into output fiber 605D via its corresponding micro-lens.

Figure 7:
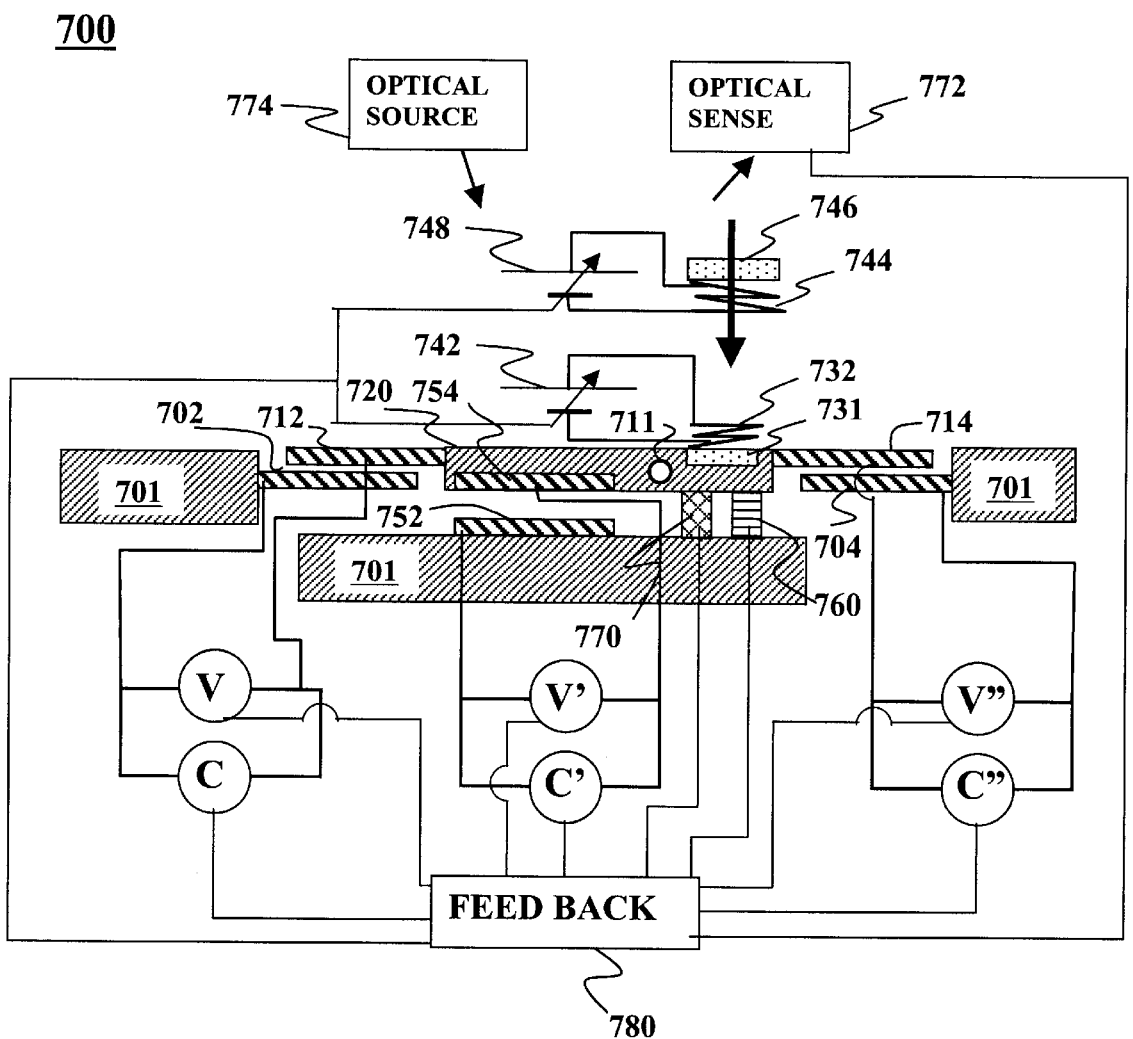
FIG. 7 depicts a simplified cross-sectional schematic diagram of a rotating device according to an embodiment of the present invention.

FIG. 7 is provided to show a schematic example of how the sensing and actuating schemes described above are deployed to track feedback for a rotating device. Any or all of these features may be incorporated into a fiber optic switch such as that shown in FIG. 6, and those fiber optic switches that achieve beam steering that use two single axis mirrors to steer the beam. It should be stated that this FIG. 7 is provided for example only to demonstrate how a rotating device 700 may include a first set of comb fingers 712 coupled to a rotating element 720. In this example, the first set of comb fingers 712 may be interdigitating and, optionally, in self-alignment with a second set of comb fingers 702, which may be coupled to a substrate 701. The rotating element may be mechanically coupled to the substrate 701 by a rotational flexure 711.

A voltage source V may be coupled between the first and second sets of comb fingers 712, 702 to provide a driving voltage. A capacitance sensor C may be coupled between the first and second sets of comb fingers 712, 702 measure an angular position of the rotating element 720. The first and second sets of comb fingers 712, 702 are shown offset from each other in FIG. 7 for the sake of clarity. Alternatively the first and second sets of comb fingers 712, 702 may be in a substantially co-planar interdigitating engagement in the absence of biasing force.

Several different types of biasing elements are depicted schematically in FIG. 7 for the sake of example. The rotating device 700 may include any or all of them or combinations where the biasing elements are linked. Such biasing elements may exert a constant biasing force to pull the first and second sets of comb fingers out of alignment. Alternatively, the biasing element may exert a time varying force that rotates the rotatable element. By way of example, the biasing element may include a magnetic material 731 and/or a current carrying coil 732 formed on the rotating element 720. A current source 742 may provide electric current to the coil 732. The magnetic material 731 and/or coil 732 may interact with an external magnetic field B produced by an external coil 744 and/or magnetic material 746. A current source 748 may provide electric current to the external coil 744.

Alternatively the biasing element may include a pair of gap-closing electrodes 752, 754 coupled respectively to the rotating element and the substrate 701. A voltage source V' coupled between the two gap closing electrodes 752, 754 may provide a voltage for driving the rotating element 720. In another embodiment, the biasing element may include third and fourth sets of comb fingers 714, 704 coupled respectively to the rotating element and the substrate 701. A voltage source V" may be coupled between the third and fourth sets of comb fingers to provide a voltage for driving the third and fourth sets of comb fingers 714, 704.

Finally, the biasing element may be an actuator 760 coupled to the rotating element 720 and the substrate 701. The actuator 760, which is represented schematically in FIG. 7, may be a mechanical actuator such as a spring loaded element, a stress bearing material carrying a residual stress gradient, a piezoelectric element or a thermal bimorph actuator. Alternatively, the rotational flexure 711 may provide a torsional bias and thus act as the biasing element.

It must be stated that the torsion biasing force can be time varied with application of combdrive electrostatics to modify device damping ratio and resonant frequency device characteristics.

The rotating device 700 may optionally include a position sensing means other than the first and second sets of comb fingers 712, 702. For example, the sensing means may be the gap closing electrodes 752, 754, which may optionally be coupled to a capacitance sensor C' to provide a means for sensing the angular position of the rotating element 720. Furthermore, the sensing means may include the third and fourth sets of comb fingers 714, 704. A capacitance sensor C" may be coupled between the third and fourth sets of comb fingers 714, 704 to provide a means for sensing the angular position of the rotational element 720. Finally the device 700 may include a sensor element 770, shown schematically in FIG. 7, such as a piezoresistive strain gauge or piezoelectric sensor mechanically coupled between the rotational element and the substrate 701. Alternatively, the device 700 may include an optical sensor 772, e.g., that senses a change in an optical signal from an optical source 774 to sense a change in the angular position of the rotating element 720.

Where the first and second sets of biased comb fingers are used to drive the rotational element 720, the position sensing means, e.g., any or all of the capacitance sensors C, C', C" or the sensor element 770 may be coupled via a feedback element 780 to the voltage source V that drives the first and second sets of biased comb fingers 712, 702. Where the first and second sets of biased comb are used to sense the angular position of the rotating element 720 the capacitance sensor C may be coupled via the feedback element 780 to the biasing means, e.g., either of the current sources 742, 744, either of the voltage sources V', V", or the actuator 760. Of course, if the first and second sets of biased comb fingers 712, 704 are used to both drive the rotational element 720 and sense its angular position, the capacitance sensor C may be coupled to the voltage source V via the feedback element 780 in a feedback control loop. The feed back control element 780 may be implemented in hardware, software, firmware, or some combination thereof.

The various embodiments of the present invention provide a novel class of biased combdrive actuators and position sensors that employ self-aligned combdrives and a biasing means for generating a constant and/or time-varying angular displacement. Such self-aligned combdrive devices can rotate uni-axially or bi-axially, so as to provide for one-dimensional and two-dimensional scanning devices.

An important advantage of the self-aligned rotating combdrive and position sensor devices according to embodiments of the present invention is that the first and second comb fingers may be fabricated in a single layer of a substrate and hence substantially interdigitated according to a predetermined engagement. This significantly simplifies the underlying fabrication process. Another important advantage of the present invention is that because the first and second comb fingers begin from a substantially co-planar and interdigitated engagement, non-linear rotational effects that are inherent in the prior art combdrive actuators are substantially reduced. Furthermore, since the rotating devices of the present invention may be self-aligned, instabilities that arise from misalignment between the first and second combs in the prior art can be avoided. The self-aligned rotating combdrive actuators and position sensors thus produced provide more predictable and reliable performance. Further advantages of the self-aligned combdrive rotating actuators and position sensors of the present invention are manifest in their simple design, compact size, low cost, and versatile performance.

Although the present invention and its advantages have been described in detail, it should be understood that various changes, substitutions, and alterations can be made herein without departing from the principle and the scope of the invention. Specifically, it must be stated that the methods of operating a combdriven actuator by application of a torsion force, sensing the position of the actuator and controlling torsion force and/or comb-finger voltage in response thereto, may apply to any combdrive as well as the self-aligned combdrive of the present invention. It must also be stated that the position sensor element may operate on principals other than capacitance and that the bias force may be applied mechanically, non-mechanically and through manipulation of electromagnetic energy. Accordingly, the scope of the present invention should be determined by the following claims and their legal equivalents.

What is claimed is:

1. A rotating device, comprising:
   a) a first plurality of first comb fingers extending from a first structure;
   b) a first plurality of second comb fingers extending from a second structure, wherein said first comb fingers are interdigitated with said second comb fingers in an engagement
   c) a rotating element attached to a rotatable flexure disposed a long an axis, wherein said rotating element is mechanically coupled to said first structure and hence said first comb fingers; and d) a biasing element coupled to said rotating element, for causing said first comb fingers along with said rotating element to undergo a controlled angular displacement from said engagement about said axis;
   wherein said first comb fingers along with said rotating element can further rotate about said axis, once displaced from said engagement.

2. The rotating device of claim 1 further comprising a capacitance sensor, coupled between said second comb fingers and said first comb fingers.

3. The rotating device of claim 2 further comprising a feedback mechanism coupled to said capacitance sensor and said biasing element.

4. The rotating device of claim 1 further comprising a voltage source coupled between said second comb fingers and said first comb fingers.

5. The rotating device of claim 4, wherein a voltage between the first and second comb fingers provided by the voltage source produces a force between the first and second comb fingers that tends to displace the first and second comb fingers along with said rotating element the back toward said engagement.

6. The rotating device of claim 4 further comprising a position sensor.

7. The rotating device of claim 6, further comprising a feedback mechanism coupled between the position sensor and voltage source.

8. The rotating device of claim 6, wherein the position sensor includes one or more of the following:
   one or more gap closing electrodes,
   a second plurality of first comb fingers coupled to the rotating element and a second plurality of second comb fingers that interdigitate with the first comb fingers in the second plurality,
   a capacitance sensor coupled between the first plurality of first comb fingers and the first plurality of second comb fingers
   a piezoresistive strain gauge,
   a piezoelectric sensor,
   an optical sensor.

9. The rotating device of claim 1 wherein said biasing element exerts a time-varying biasing force on said rotating element.

10. The rotating device of claim 1 wherein said biasing element exerts a constant biasing force on said rotating element.

11. The rotating device of claim 1 wherein said rotatable flexure is attached to a substrate.

12. The rotating device of claim 1 wherein said rotatable flexure comprises a stress-bearing material carrying a residual stress gradient, whereby upon releasing said residual stress gradient, said stress-bearing material causes said first comb fingers along with said rotating element to undergo said controlled angular displacement about said axis.

13. The rotating device of claim 11 wherein said substrate comprises a material selected from the group consisting of single-crystalline silicon, poly-crystalline silicon, single-crystalline silicon-germanium, poly-crystalline silicon-germanium, ceramic, silicon-oxide, silicon-nitride, chrome, aluminum, nickel, and gold.

14. The rotating device of claim 1 wherein said rotatable flexure comprises an element selected from the group consisting of torsional flexures with rectangular, I-shaped, or T-shaped cross-section, cantilever-like flexures, serpentine flexures, and pin-and-staple type hinges.

15. The rotating device of claim 1 wherein said second comb fingers and said first comb fingers comprise a material selected from the group consisting of single-crystalline silicon, poly-crystalline silicon, amorphous silicon, ceramic, glass, single-crystalline silicon-germanium, poly-crystalline silicon-germanium, nickel, and nickel alloy.

16. The rotating device of claim 1 wherein said second comb fingers are electrically isolated from said first comb fingers.

17. The rotating device of claim 1 wherein said rotating element is made of a material selected from the group consisting of single-crystalline silicon, poly-crystalline silicon, amorphous silicon, ceramic, glass, single-crystalline silicon-germanium, poly-crystalline silicon-germanium, nickel, and nickel alloy gold, aluminum, and chromium.

18. The rotating device of claim 1 wherein said rotating element comprises one or more reflective surfaces.

19. The rotating device of claim 1, wherein the device is employed in an optical switch.

20. The rotating device of claim 1 wherein said biasing element includes one or more of the following:
   a magnetic material attached to the rotating element,
   a current carrying coil attached to the rotating element,
   one or more gap-closing electrodes attached to the rotating element,
   a piezoelectric mechanism coupled to said rotating element,
   a thermal bimorph actuator coupled to the rotating element,
   a spring-loaded element coupled to the rotating element,
   a stress-bearing material carrying a residual stress gradient, or
   a second plurality of first comb fingers coupled to the rotating element and a second plurality of second comb fingers that interdigitate with the first comb fingers in the second plurality.

21. The rotating device of claim 20 further comprising a capacitance sensor coupled between said first plurality of second comb fingers and said first plurality of first comb fingers.

22. The rotating device of claim 21 further comprising a feedback mechanism coupled to said capacitance sensor and said biasing element.

23. The rotating device of claim 20 further comprising a capacitance sensor coupled between said first plurality of second comb fingers and said first plurality of first comb fingers.

24. The rotating device of claim 23 further comprising a position sensor to sense the position of the rotating element.

25. The rotating device of claim 24, further comprising a feedback mechanism coupled between the position sensor and voltage source.

26. The rotating device of claim 24, wherein the position sensor includes one or more of the following:
   one or more gap closing electrodes,
   a second plurality of first comb fingers coupled to the rotating element and a second plurality of second comb fingers that interdigitate with the first comb fingers in the second plurality,
   a capacitance sensor coupled between the first plurality of first comb fingers and the first plurality of second comb fingers
   a piezoresistive strain gauge,
   a piezoelectric sensor, or
   an optical sensor.

27. The rotating device of claim 20 wherein said biasing element produces a time-varying biasing force.

28. The rotating device of claim 20 wherein said biasing element produces a constant biasing force.

29. The rotating device of claim 1, further comprising:
   e) a frame having a third structure coupled to the rotatable flexure;
   f) a plurality of third comb fingers extending from the third structure
   g) a second rotatable flexure coupled to the frame such that the frame can rotate about a second axis;
   h) a plurality of fourth comb fingers coupled to a fourth structure, wherein said third comb fingers are interdigitated with said fourth comb fingers in an engagement.

30. The device of claim 29, wherein the device is employed in an optical switch.

31. A rotating device, comprising:
   a) a first plurality of first comb fingers extending from a fist structure;
   b) a first plurality of second comb fingers extending from a second structure, wherein said first comb fingers re self-aligned and interdigitated with said second comb fingers in an engagement
   c) a rotating element attached to a rotatable flexure disposed along an axis, wherein said rotating element s mechanically coupled to said first structure and hence said first comb fingers; and
   d) a biasing element coupled to said rotating element, for causing said first comb fingers along with said rotating element to undergo a controlled angular displacement from said engagement about said axis;
      wherein said first comb fingers along with said rotating element can further rotate about said axis, once displaced from said engagement.

32. The rotating device of claim 31 further comprising a capacitance sensor, coupled between said second comb fingers and said first comb fingers.

33. The rotating device of claim 32 further comprising a feedback mechanism coupled to said capacitance sensor and said biasing element.

34. The rotating device of claim 31 further comprising a voltage source coupled between said second comb fingers and said first comb fingers.

35. The rotating device of claim 34, wherein a voltage between the first and second comb fingers provided by the voltage source produces a force between the first and second comb fingers that tends to displace the first and second comb fingers along with said rotating element the back toward said engagement.

36. The rotating device of claim 34 further comprising a position sensor.

37. The rotating device of claim 36, further comprising a feedback mechanism coupled between the position sensor and voltage source.

38. The rotating device of claim 36, wherein the position sensor includes one or more of the following:
   one or more gap closing electrodes,
   a second plurality of first comb fingers coupled to the rotating element and a second plurality of second comb fingers that interdigitate with the first comb fingers in the second plurality,
   a capacitance sensor coupled between the first plurality of first comb fingers and the first plurality of second comb fingers
   a piezoresistive strain gauge,
   a piezoelectric sensor,
   an optical sensor.

39. The rotating device of claim 31 wherein said biasing element exerts a time-varying biasing force on said rotating element.

40. The rotating device of claim 31 wherein said biasing element exerts a constant biasing force on said rotating element.

41. The rotating device of claim 31 wherein said rotatable flexure is attached to a substrate.

42. The rotating device of claim 31 wherein said rotatable flexure comprises a stress-bearing material carrying a residual stress gradient, whereby upon releasing said residual stress gradient, said stress-bearing material causes said first comb fingers along with said rotating element to undergo said controlled angular displacement about said axis.

43. The rotating device of claim 41 wherein said substrate comprises a material selected from the group consisting of single-crystalline silicon, poly-crystalline silicon, single-crystalline silicon-germanium, poly-crystalline silicon-germanium, ceramic, silicon-oxide, silicon-nitride, chrome, aluminum, nickel, and gold.

44. The rotating device of claim 41 wherein said rotatable flexure comprises an element selected from the group consisting of torsional flexures with rectangular, I-shaped, or T-shaped cross-section, cantilever-like flexures, serpentine flexures, and pin-and-staple type hinges.

45. The rotating device of claim 41 wherein said second comb fingers and said first comb fingers comprise a material selected from the group consisting of single-crystalline silicon, poly-crystalline silicon, amorphous silicon, ceramic, glass, single-crystalline silicon-germanium, poly-crystalline silicon-germanium, nickel, and nickel alloy.

46. The rotating device of claim 41 wherein said second comb fingers are electrically isolated from said first comb fingers.

47. The rotating device of claim 41 wherein said rotating element is made of a material selected from the group consisting of single-crystalline silicon, poly-crystalline silicon, amorphous silicon, ceramic, glass, single-crystalline silicon-germanium, poly-crystalline silicon-germanium, nickel, and nickel alloy gold, aluminum, and chromium.

48. The rotating device of claim 41 wherein said rotating element comprises one or more reflective surfaces.

49. The rotating device of claim 41, wherein the device is employed in an optical switch.

50. The rotating device of claim 41 wherein said biasing element includes one or more of the following:
   a magnetic material attached to the rotating element,
   a current carrying coil attached to the rotating element,
   one or more gap-closing electrodes attached to the rotating element,
   a piezoelectric mechanism coupled to said rotating element,
   a thermal bimorph actuator coupled to the rotating element,
   a spring-loaded element coupled to the rotating element,
   a stress-bearing material carrying a residual stress gradient, or
   a second plurality of first comb fingers coupled to the rotating element and a second plurality of second comb fingers that interdigitate with the first comb fingers in the second plurality.

51. The rotating device of claim 50 further comprising a capacitance sensor coupled between said first plurality of second comb fingers and said first plurality of first comb fingers.

52. The rotating device of claim 51 further comprising a feedback mechanism coupled to said capacitance sensor and said biasing element.

53. The rotating device of claim 50 further comprising a voltage source coupled between said second comb fingers and said first comb fingers.

54. The rotating device of claim 53 further comprising a position sensor to sense the position of the rotating element.

55. The rotating device of claim 54, further comprising a feedback mechanism coupled between the position sensor and voltage source.

56. The rotating device of claim 54, wherein the position sensor includes one or more of the following:

one or more gap closing electrodes, a second plurality of first comb fingers coupled to the rotating element and a second plurality of second comb fingers that interdigitate with the first comb fingers in the second plurality, a capacitance sensor coupled between the first plurality of first comb fingers and the first plurality of second comb fingers a piezoresistive strain gauge, a piezoelectric sensor, or an optical sensor.

57. The rotating device of claim 50 wherein said biasing element produces a time-varying biasing force.

58. The rotating device of claim 50 wherein said biasing element produces a constant biasing force.

59. The rotating device of claim 31, further comprising:

e) a frame having a third structure coupled to the rotatable flexure;

f) a plurality of third comb fingers extending from the third structure g) a second rotatable flexure coupled to the frame such that the frame can rotate about a second axis;

h) a plurality of fourth comb fingers coupled to a fourth structure, wherein said third comb fingers are self-aligned and interdigitated with said fourth comb fingers in an engagement.

60. The device of claim 59, wherein the device is employed in an optical switch.

\* \* \* \* \*